United States Patent
Cao et al.

(10) Patent No.: US 12,276,242 B1
(45) Date of Patent: Apr. 15, 2025

(54) INTAKE BYPASS RECIRCULATION STRUCTURE CAPABLE OF SILENCING

(71) Applicant: Harbin Engineering University, Harbin (CN)

(72) Inventors: Yipeng Cao, Harbin (CN); Yao Song, Harbin (CN); Chen Liu, Harbin (CN); Xiaochen Zhao, Harbin (CN); Jiaxuan Lin, Harbin (CN); Shaoran Du, Harbin (CN); Jie Yang, Harbin (CN); Jie Guo, Harbin (CN); Xinyu Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 18/985,624

(22) Filed: Dec. 18, 2024

(30) Foreign Application Priority Data

Dec. 29, 2023 (CN) .......................... 202311861626.7

(51) Int. Cl.
*F02M 35/12* (2006.01)
*F02M 35/10* (2006.01)

(52) U.S. Cl.
CPC .... *F02M 35/1227* (2013.01); *F02M 35/1222* (2013.01); *F02M 35/10118* (2013.01)

(58) Field of Classification Search
CPC ........... F02M 35/1227; F02M 35/1222; F02M 35/10118
USPC ......................................................... 181/229
See application file for complete search history.

(56) References Cited

U.S. PATENT DOCUMENTS

| | | | | |
|---|---|---|---|---|
| 6,681,888 B2 * | 1/2004 | Lepoutre | ............ | F02M 35/1261 181/269 |
| 7,540,353 B2 * | 6/2009 | Okawa | ............... | F02M 35/1266 123/184.57 |
| 7,556,123 B2 * | 7/2009 | Ido | .......................... | F01N 1/023 181/255 |
| 7,802,651 B2 * | 9/2010 | Park | ....................... | F02M 35/14 55/502 |
| 7,967,106 B2 * | 6/2011 | Ross | .................. | F02M 35/1261 123/184.55 |
| 8,177,024 B2 * | 5/2012 | Caliskan | ............ | F02M 35/1216 123/184.53 |

(Continued)

OTHER PUBLICATIONS

CNIPA, Office Action, Application No. 202311861626.7, Aug. 8, 2024.

*Primary Examiner* — Forrest M Phillips
(74) *Attorney, Agent, or Firm* — WCF IP

(57) ABSTRACT

Provided is an intake bypass recirculation structure capable of silencing, including: an intake bypass recirculation structure body and a structure-conducted silencing device. An intake bypass recirculation cavity is provided on the intake bypass recirculation structure body. An inlet of the intake bypass recirculation structure and an outlet of the intake bypass recirculation structure that are provided on the intake bypass recirculation structure body are each connected to the intake bypass recirculation cavity. The structure-conducted silencing device is disposed inside the intake bypass recirculation cavity. In this application, during working, noise generated by a compressor is transmitted into the intake bypass recirculation cavity via an inlet of the intake bypass recirculation structure, and transmitted outside via the outlet of the intake bypass recirculation structure.

8 Claims, 2 Drawing Sheets

(56) References Cited

U.S. PATENT DOCUMENTS

| | | | | |
|---|---|---|---|---|
| 10,436,159 | B2* | 10/2019 | Hartmann | F16L 55/052 |
| 10,519,904 | B2* | 12/2019 | Cho | F02M 35/1261 |
| 11,067,084 | B2* | 7/2021 | Thomes | F01N 1/24 |
| 11,448,172 | B2* | 9/2022 | Lee | F02M 35/1283 |
| 2016/0201621 | A1* | 7/2016 | Grieswald | F02M 35/1261 |
| | | | | 181/229 |

* cited by examiner

INTAKE BYPASS RECIRCULATION STRUCTURE CAPABLE OF SILENCING

CROSS REFERENCE TO RELATED APPLICATION

This patent application claims the benefit and priority of Chinese Patent Application No. 2023118616267, filed with the China National Intellectual Property Administration on Dec. 29, 2023, the disclosure of which is incorporated by reference herein in its entirety as part of the present application.

TECHNICAL FIELD

The present disclosure relates to the technical field of an intake structure of an engine supercharger, and in particular to an intake bypass recirculation structure capable of silencing.

BACKGROUND

In recent years, in order to meet the requirements of high dynamic performance and high economic indicators for modern internal combustion engines, especially the requirements for conveyor-type supercharged diesel engines and supercharged diesel engines for engineering machinery to maintain enough boost pressures in wide ranges of speeds and loads and obtain satisfactory low-speed engines performance (economic performance and emission indicators), supercharger compressors that are matched with the supercharged diesel engines each have a wide range of a suitable flow rate while having high efficiency, especially achieving a high pressure ratio at a low flow rate. In this way, the surge line of the compressor must move toward the low flow rate. An effective technical measure to expand a range of the flow rate of the compressor is to use an intake bypass recirculation system of the compressor, and has been widely used at present.

With the development of design technologies, turbochargers continue to develop towards a large flow rate and a high pressure ratio. However, the noise problem of the supercharger has become increasingly prominent. Excessive noise is a potential hidden danger for the normal operation of the equipment, and unfavorable to the normal work and life of the staff. A large number of studies have confirmed that a high sound pressure level frequency of aerodynamic noise of the compressor is one of the main noise sources of the supercharger. Therefore, the noise of the supercharger can be effectively reduced by reducing the aerodynamic noise of the compressor. One of the main methods for reducing the noise is to control the noise on the spreading path. At present, the noise is mainly reduced by mounting a silencer. There are a few measures to reduce the noise by changing the structure of the intake pipe of the compressor.

In conclusion, the existing compressor of the supercharged engine generates excessive noise. As a result, the excessive noise increases the potential hidden danger of the normal operation of the equipment, and is not conducive to the normal work and life of the staff.

SUMMARY

An objective of the present disclosure is to provide an intake bypass recirculation structure capable of silencing, to resolve the problems in the conventional technologies. Noise generated by a compressor of a supercharged engine can be reduced by setting an intake bypass recirculation structure capable of silencing at an intake pipe, to eliminate hidden dangers caused by excessive noise when equipment works normally.

To achieve the foregoing objective, the present disclosure provides the following solution:

The present disclosure provides an intake bypass recirculation structure capable of silencing. The intake bypass recirculation structure capable of silencing includes: an intake bypass recirculation structure body, connected to an intake pipe, where an intake bypass recirculation cavity is provided on the intake bypass recirculation structure body in a circumferential direction, the intake bypass recirculation structure body has an inlet of the intake bypass recirculation structure provided on a side close to an outlet of the intake pipe and an outlet of the intake bypass recirculation structure provided on a side close to an inlet of the intake pipe, and the inlet of the intake bypass recirculation structure and the outlet of the intake bypass recirculation structure are each connected to the intake bypass recirculation cavity; and the structure-conducted silencing device, disposed inside the intake bypass recirculation cavity and including two diaphragms, where the gas is filled inside a cavity of the structure-conducted silencing device. In the present disclosure, during working, noise generated by a compressor is transmitted into the intake bypass recirculation cavity via the inlet of the intake bypass recirculation structure, and transmitted outside via the outlet of the intake bypass recirculation structure. Due to a special structure of the outlet of the intake bypass recirculation structure, the noise generates a plurality of columns of acoustic waves that interfere with each other when flowing through the outlet of the intake bypass recirculation structure. Different acoustic waves interfere with each other due to a difference between wavelengths of the different acoustic waves, to achieve the effect of reducing the noise.

Optionally, the intake bypass recirculation structure body includes an inner wall of the intake bypass recirculation structure, an outer wall of the intake bypass recirculation structure is sleeved on the inner wall of the intake bypass recirculation structure, an end of the outer wall of the intake bypass recirculation structure is fixedly connected to an end of the inner wall of the intake bypass recirculation structure by means of a seal of the intake bypass recirculation structure, the other end of the outer wall of the intake bypass recirculation structure and the other end of the inner wall of the intake bypass recirculation structure are each fixedly and hermetically connected to a flange of the intake pipe, space among the flange of the intake pipe, the outer wall of the intake bypass recirculation structure, the seal of the intake bypass recirculation structure, and the inner wall of the intake bypass recirculation structure forms the intake bypass recirculation cavity, and the inlet of the intake bypass recirculation structure and the outlet of the intake bypass recirculation structure are each provided on the inner wall of the intake bypass recirculation structure; and the outlet of the intake pipe is located at an end close to the flange of the intake pipe, and the inlet of the intake pipe is located at an end close to the seal of the intake bypass recirculation structure.

Optionally, the diaphragms include an upstream diaphragm and a downstream diaphragm that are disposed symmetrically, and the upstream diaphragm is connected to the downstream diaphragm by means of a lightweight rigid plate.

Optionally, the structure-conducted silencing device is connected to an inner wall of the intake bypass recirculation cavity by means of a plurality of guide pillars.

Optionally, an annular diaphragm is fixedly and hermetically disposed at each of two ends of the structure-conducted silencing device, and the two annular diaphragms are respectively located on an inner side of the inlet of the intake bypass recirculation structure and an inner side of the outlet of the intake bypass recirculation structure; and space among the two diaphragms and the two annular diaphragms forms the structure-conducted silencing device.

Optionally, the inlet of the intake bypass recirculation structure and the outlet of the intake bypass recirculation structure each are a circular opening structure.

Optionally, the two annular diaphragms are connected to each other by means of a lightweight rigid plate.

Optionally, the inner wall of the intake bypass recirculation structure, the outer wall of the intake bypass recirculation structure, the flange of the intake pipe, and the structure-conducted silencing device are disposed coaxially.

Optionally, the gas filled inside the cavity of the structure-conducted silencing device is helium or another gas capable of reducing gas impedance.

Compared with the prior art, the present disclosure has the following technical effect:

In the present disclosure, because the structure-conducted silencing device is disposed in the intake bypass recirculation cavity, the noise generated by the compressor is transmitted into the intake bypass recirculation cavity via the inlet of the intake bypass recirculation structure, and transmitted outside via the outlet of the intake bypass recirculation structure after passing through the structure-conducted silencing device and the intake bypass recirculation cavity. In this way, a plurality of columns of acoustic waves at different distances are transmitted outside via the outlet of the intake bypass recirculation structure. A travel difference between columns of acoustic waves is continuous in a range. Therefore, noise in one frequency band can be reduced due to interference between the acoustic waves transmitted via the outlet of the intake bypass recirculation structure in the present disclosure.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

Figure 1:
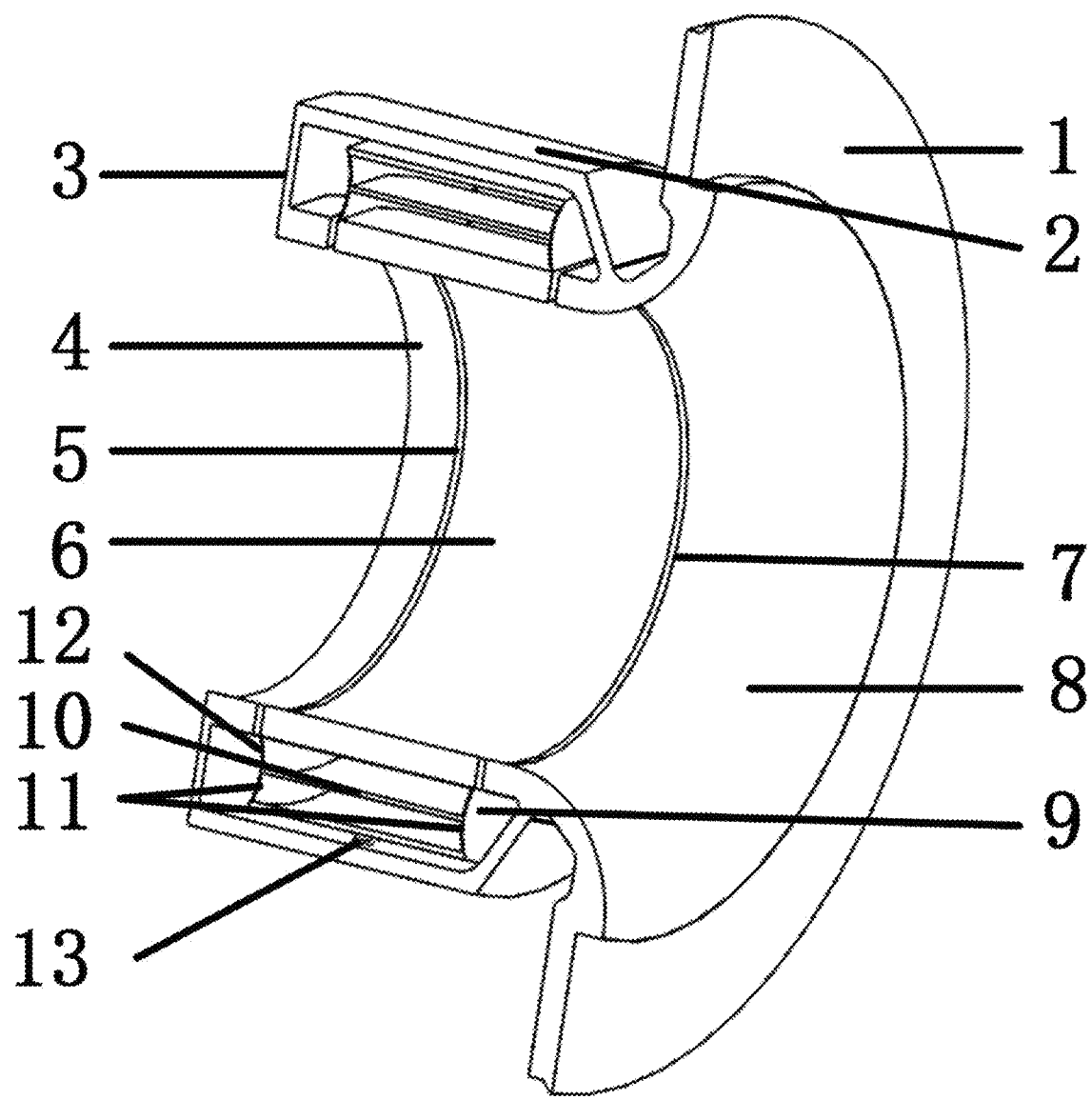
FIG. 1 is a three-dimensional schematic diagram of a cross-section of an intake bypass recirculation structure capable of silencing according to the present disclosure.

Reference numerals: 1: flange of intake pipe; 2: outer wall of intake bypass recirculation structure; 3: seal of intake bypass recirculation structure; 4: inlet of intake pipe; 5: outlet of intake bypass recirculation structure; 6: inner wall of intake bypass recirculation structure; 7: inlet of intake bypass recirculation structure; 8: outlet of intake pipe; 9: upstream diaphragm; 10: lightweight rigid plate; 11: annular diaphragm; 12: downstream diaphragm; 13: guide pillar.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide an intake bypass recirculation structure capable of silencing, to resolve the problems in the conventional technologies. Noise generated by a compressor of a supercharged engine can be reduced by setting an intake bypass recirculation structure capable of silencing at an intake pipe, to eliminate hidden dangers caused by excessive noise when equipment works normally.

In order to make the above objective, features and advantages of the present disclosure clearer and more comprehensible, the present disclosure will be further described in detail below in combination with accompanying drawings and particular implementation modes.

Figure 2:
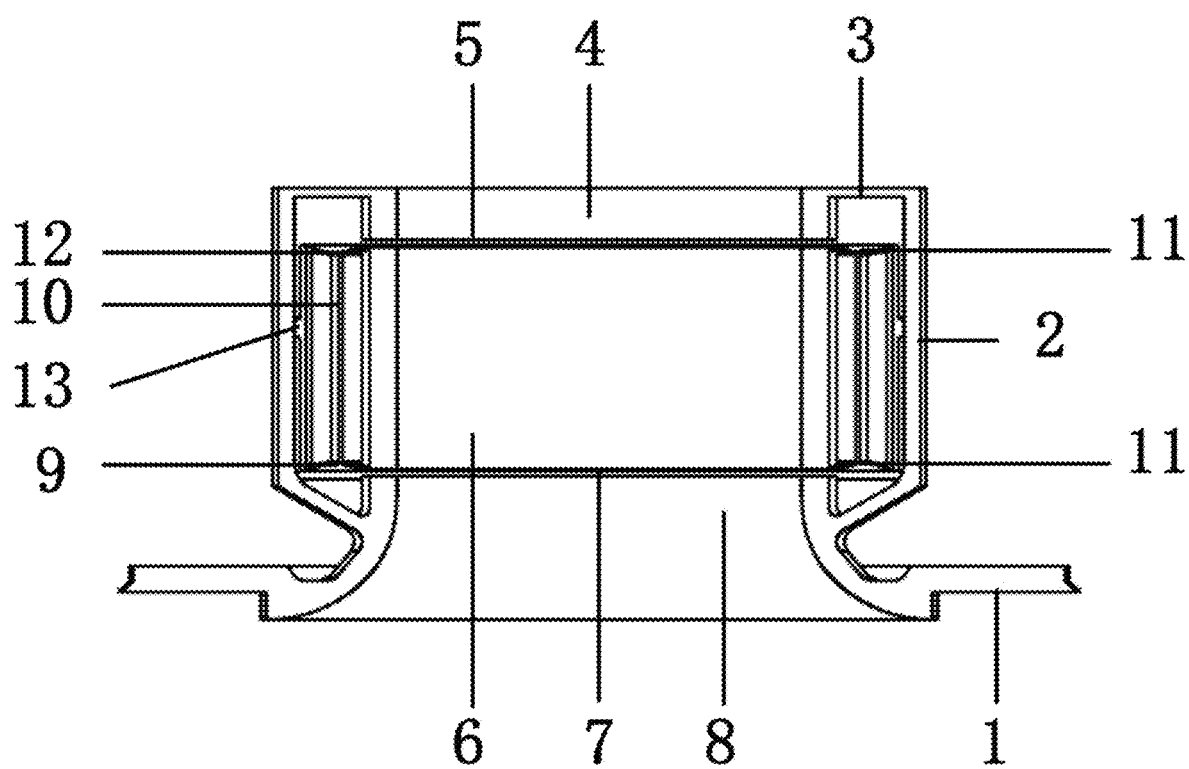
FIG. 2 is a plan view of a cross-section of an intake bypass recirculation structure capable of silencing according to the present disclosure.

Referring to FIG. 1 and FIG. 2, the present disclosure provides an intake bypass recirculation structure capable of silencing. The intake bypass recirculation structure capable of silencing includes an intake bypass recirculation structure body and a structure-conducted silencing device. An end of the intake bypass recirculation structure body is connected to an intake pipe by means of a flange 1 of the intake pipe, and an intake bypass recirculation cavity is provided on the intake bypass recirculation structure body in a circumferential direction. The intake bypass recirculation structure body has an inlet 7 on a side close to an outlet 8 of the intake pipe and an outlet 5 of the intake bypass recirculation structure provided on a side close to an inlet 4 of the intake pipe, and the inlet 7 of the intake bypass recirculation structure and the outlet 5 of the intake bypass recirculation structure are each connected to the intake bypass recirculation cavity.

In a specific embodiment, to enable sealing performance of the intake bypass recirculation cavity to be better and to fit the piping structure, the intake bypass recirculation structure body includes an inner wall 6 of the intake bypass recirculation structure, an outer wall 2 of the intake bypass recirculation structure is sleeved on the inner wall of the intake bypass recirculation structure. An end of the outer wall 2 of the intake bypass recirculation structure is fixedly connected to an end of the inner wall 6 of the intake bypass recirculation structure by means of a seal 3 of the intake bypass recirculation structure, and the other end of the outer wall 2 of the intake bypass recirculation structure and the other end of the inner wall 6 of the intake bypass recirculation structure are each fixedly and hermetically connected to the flange 1 of the intake pipe. Space among the flange 1 of the intake pipe, the outer wall 2 of the intake bypass recirculation structure, the seal 3 of the intake bypass recirculation structure, and the inner wall 6 of the intake bypass recirculation structure forms the intake bypass recirculation cavity. The inlet 7 of the intake bypass recirculation structure and the outlet 5 of the intake bypass recirculation structure are each provided on the inner wall 6 of the intake bypass recirculation structure. The outlet 8 of the intake pipe is located at an end close to the flange 1 of the intake pipe, and the inlet 4 of the intake pipe is located at an end close to the seal 3 of the intake bypass recirculation structure. The structure-conducted silencing device is disposed inside the intake bypass recirculation cavity, and includes an upstream diaphragm 9 and a downstream diaphragm 12 that are disposed symmetrically.

The noise generated by the compressor is transmitted into the intake bypass recirculation cavity via the inlet 7 of the intake bypass recirculation structure, and transmitted outside via the outlet 5 of the intake bypass recirculation structure after passing through the structure-conducted silencing device and the intake bypass recirculation cavity. Due to a special structure of the intake bypass recirculation structure and a special structure of the structure-conducted silencing device, the noise generates a plurality of columns of acoustic waves that interfere with each other when flowing through the outlet of the intake bypass recirculation structure. Different acoustic waves interfere with each other due to a difference between wavelengths of the different acoustic waves, to achieve the effect of reducing the noise. In the present disclosure, the acoustic waves are transmitted into the intake bypass recirculation cavity via the inlet 7 of the intake bypass recirculation structure, resulting in vibration of the upstream diaphragm 9 and the downstream diaphragm 12 of the structure-conducted silencing device. Then, the acoustic waves are transmitted outside via the outlet 5 of the intake bypass recirculation structure. A wavelength of the noise wave is set to 2, to enable a difference between the wavelength 2 of the noise at the outlet 5 of the intake bypass recirculation structure of the main pipe and a wavelength 21 of the noise generated by vibration of the upstream diaphragm and the downstream diaphragm of the structure-conducted silencing device to be a half, and enable a difference between the wavelength $\lambda$ of the noise at the outlet 5 of the intake bypass recirculation structure of the main pipe and a wavelength 22 of the noise transmitted outside via the outlet 5 of the intake bypass recirculation structure after the noise passes through the intake bypass recirculation structure to be a half. Considering the interference between two columns of acoustic waves, peaks of the two columns of acoustic waves are overlapped with valleys of the two columns of acoustic waves, to reduce the amplitude, thereby achieving the effect of reducing the noise.

In a specific embodiment, to enable a connection to be more stable, the structure-conducted silencing device is connected to the inner wall of the intake bypass recirculation cavity by means of four guide pillars 13. The upstream diaphragm 9 is connected to the downstream diaphragm 12 by means of a lightweight rigid plate 10. An annular diaphragm 11 is fixedly and hermetically disposed at each of two ends of the upstream diaphragm 9 and two ends of the downstream diaphragm 12, and the two annular diaphragms 11 are fixed by means of a lightweight rigid plate 10. The two annular diaphragms 11 are respectively located on an inner side of the inlet 7 of the intake bypass recirculation structure and an inner side of the outlet 5 of the intake bypass recirculation structure. Space among the upstream diaphragm 9, the downstream diaphragm 12, and the two annular diaphragms 11 forms a cavity of the structure-conducted silencing device, and helium or another gas capable of reducing gas impedance is filled inside the cavity of the structure-conducted silencing device.

To enable the intake bypass recirculation structure capable of silencing to be fitted with a structure of the intake pipe, the inner wall 6 of the intake bypass recirculation structure, the outer wall 2 of the intake bypass recirculation structure, the flange 1 of the intake pipe, and the structure-conducted silencing device is disposed coaxially, and the inlet 7 of the intake bypass recirculation structure and the outlet 5 of the intake bypass recirculation structure each are a circular opening structure.

The noise at the intake pipe of the supercharger is mainly generated due to stator rotor interaction, that is, at a junction of a rotating impeller and the outlet 8 of the intake pipe, and the inlet 7 of the intake bypass recirculation structure is usually located on a side of the rotating impeller at the junction of the rotating impeller and the outlet 8 of the intake pipe, which is close to the junction. In this way, the noise is transmitted outside by means of the intake pipe and the intake bypass recirculation structure. In the present disclosure, the acoustic waves are transmitted into the intake bypass recirculation cavity via the inlet 7 of the intake bypass recirculation structure, and transmitted outside via the outlet 5 of the intake bypass recirculation structure after passing through the intake bypass recirculation structure and the structure-conducted silencing device. In this process, a fast sound transmission channel is formed inside the branch cavity. The acoustic waves excite the diaphragm to vibrate periodically when reaching the upstream diaphragm 9 from a main pipe. The lightweight rigid plate 10 between the two diaphragms transmits the acoustic waves, and immediately transmits the excited acoustic waves of the upstream diaphragm 9 to the downstream diaphragm 12, to enable the downstream diaphragm 12 to vibrate identically. In this case, the time delay that the acoustic waves are transmitted from the upstream diaphragm 9 to the downstream diaphragm 12 is almost zero, resulting in a specific phase difference between noise spreading of the branch cavity and the main pipe, thereby achieving the effect of reducing the noise.

In the description of the present disclosure, it should be noted that the orientation or positional relationships indicated by the terms "center", "top", "bottom", "left", "right", "vertical", "horizontal", "inside", and "outside" are based on the orientation or positional relationships shown in the accompanying drawings, are merely for facilitating the description of the present disclosure and simplifying the description, rather than indicating or implying that an apparatus or element referred to must have a particular orientation or be constructed and operated in a particular orientation, and therefore will not be interpreted as limiting the present disclosure. Furthermore, the terms "first" and "second" are used for descriptive purposes only and are not to be understood as indicating or implying relative importance.

Specific examples are used herein to explain the principles and implementations of the present disclosure. The foregoing description of the embodiments is merely intended to help understand the method of the present disclosure and its core ideas; besides, various modifications may be made by those of ordinary skill in the art to specific implementations and the scope of application in accordance with the ideas of the present disclosure. In conclusion, the content of this specification shall not be construed as limitations to the present disclosure.

What is claimed is:

1. An intake bypass recirculation structure capable of silencing, comprising:
 an intake bypass recirculation structure body, wherein an intake bypass recirculation cavity is provided on the intake bypass recirculation structure body in a circumferential direction, the intake bypass recirculation structure body has an inlet of the intake bypass recirculation structure provided on a side close to an outlet of an intake pipe and an outlet of the intake bypass recirculation structure provided on a side close to an inlet of the intake pipe, and the inlet of the intake bypass recirculation structure and the outlet of the intake bypass recirculation structure are each connected to the intake bypass recirculation cavity; and a structure-conducted silencing device, disposed inside the intake bypass recirculation cavity and comprising two diaphragms, wherein a gas is filled inside a cavity of the structure-conducted silencing device; and the diaphragms comprise an upstream diaphragm and a downstream diaphragm that are disposed symmetrically, and the upstream diaphragm is connected to the downstream diaphragm by means of a lightweight rigid plate.

2. The intake bypass recirculation structure capable of silencing according to claim 1, wherein the intake bypass recirculation structure body comprises an inner wall of the intake bypass recirculation structure, an outer wall of the intake bypass recirculation structure is sleeved on the inner wall of the intake bypass recirculation structure, an end of the outer wall of the intake bypass recirculation structure is fixedly connected to an end of the inner wall of the intake bypass recirculation structure by means of a seal of the intake bypass recirculation structure, the other end of the outer wall of the intake bypass recirculation structure and the other end of the inner wall of the intake bypass recirculation structure are each fixedly and hermetically connected to a flange of the intake pipe, space among the flange of the intake pipe, the outer wall of the intake bypass recirculation structure, the seal of the intake bypass recirculation structure, and the inner wall of the intake bypass recirculation structure forms the intake bypass recirculation cavity, and the inlet of the intake bypass recirculation structure and the outlet of the intake bypass recirculation structure are each provided on the inner wall of the intake bypass recirculation structure; and the outlet of the intake pipe is located at an end close to the flange of the intake pipe, and the inlet of the intake pipe is located at an end close to the seal of the intake bypass recirculation structure.

3. The intake bypass recirculation structure capable of silencing according to claim 1, wherein the structure-conducted silencing device is connected to an inner wall of the intake bypass recirculation cavity by means of a plurality of guide pillars.

4. The intake bypass recirculation structure capable of silencing according to claim 1, wherein an annular diaphragm is fixedly and hermetically disposed at each of two ends of structure-conducted silencing device, and the two annular diaphragms are respectively located on an inner side of the inlet of the intake bypass recirculation structure and an inner side of the outlet of the intake bypass recirculation structure; and space among the two annular diaphragms forms the structure-conducted silencing device.

5. The intake bypass recirculation structure capable of silencing according to claim 1, wherein the inlet of the intake bypass recirculation structure and the outlet of the intake bypass recirculation structure each are a circular opening structure.

6. The intake bypass recirculation structure capable of silencing according to claim 4, wherein the two annular diaphragms are connected to each other by means of a lightweight rigid plate.

7. The intake bypass recirculation structure capable of silencing according to claim 2, wherein the inner wall of the intake bypass recirculation structure, the outer wall of the intake bypass recirculation structure, the flange of the intake pipe, and the structure-conducted silencing device are disposed coaxially.

8. The intake bypass recirculation structure capable of silencing according to claim 1, wherein the gas filled inside the cavity of the structure-conducted silencing device is helium or another gas capable of reducing gas impedance.

* * * * *